Figure 4:

No. 741,570. PATENTED OCT. 13, 1903.
L. H. WALTER & J. A. EWING.
DETECTION OF ELECTRICAL OSCILLATIONS.
APPLICATION FILED APR. 29, 1903.
NO MODEL. 3 SHEETS—SHEET 1.
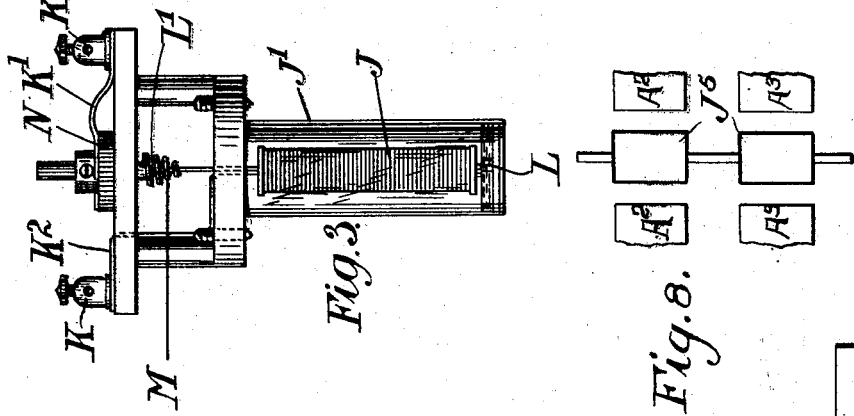
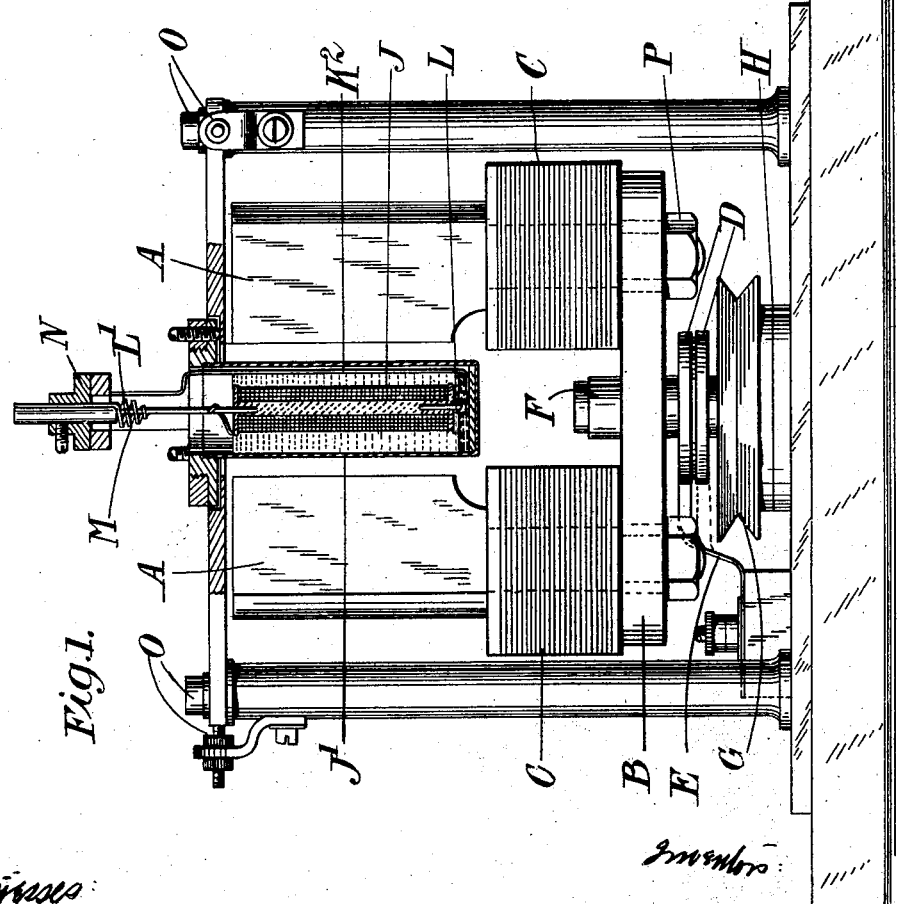

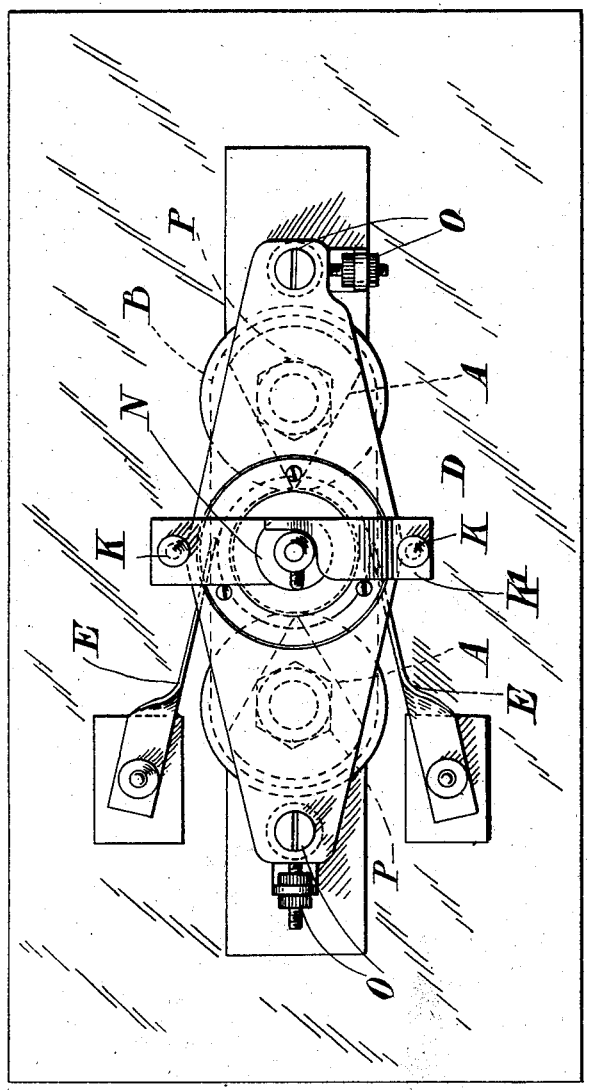

No. 741,570. PATENTED OCT. 13, 1903.
L. H. WALTER & J. A. EWING.
DETECTION OF ELECTRICAL OSCILLATIONS.
APPLICATION FILED APR. 29, 1903.
NO MODEL. 3 SHEETS—SHEET 3.

No. 741,570. Patented October 13, 1903.

UNITED STATES PATENT OFFICE.

LOUIS HEATHCOTE WALTER, OF LONDON, AND JAMES ALFRED EWING, OF CAMBRIDGE, ENGLAND.

DETECTION OF ELECTRICAL OSCILLATIONS.

SPECIFICATION forming part of Letters Patent No. 741,570, dated October 13, 1903.

Application filed April 29, 1903. Serial No. 154,843. (No model.)

*To all whom it may concern:*

Be it known that we, LOUIS HEATHCOTE WALTER, residing at London, and JAMES ALFRED EWING, residing at Cambridge, England, subjects of the King of England, have invented certain new and useful Improvements in or Relating to the Detection of Electrical Oscillations, of which the following is a specification.

This invention relates to improvements in the detection of electrical oscillations when these are set up in an electrical conductor, and has special reference to apparatus for detecting or recording the presence of such oscillations in connection with wireless telegraphy.

In carrying out this invention we employ a detector which operates through the effect of electrical oscillations on the magnetic hysteresis of iron or other magnetic metal. By "hysteresis" we here mean the amount of energy expended in effecting a reversal of magnetism. For this purpose we suspend or pivot a piece of magnetic metal in a revolving magnetic field, so that it may be deflected in consequence of its hysteresis, thereby employing a principle already utilized in an apparatus designed by one of us to test the magnetic quality of iron. We cause the electrical oscillations to act on this suspended magnetic metal either by passing through it or through a coil acting on it. This affects the amount of the deflection, and so allows the presence of the oscillations to be detected or recorded by means of any suitable form of indicating or registering apparatus. Since the amount of the effect depends upon the strength of the oscillations, the apparatus may be used for quantitive indications.

Magnetic detectors of electrical oscillations as hitherto constructed have been based on the reduction of hysteresis which occurs when an iron core is subjected to a slowly-varying magnetic field and the oscillations to be detected are caused to pass through a coil wound round the core, thus causing a surging to and fro of the magnetic lines, alternately helping and opposing the magnetic lines in the core due to the slowly-varying field, and the effect is detected by means of currents which are thereby induced in another coil, also wound on the core; but we have discovered that under certain conditions electrical oscillations produce an effect, not previously recognized, of an opposite character—namely, to increase the hysteresis of a magnetic metal—and we preferably employ this novel property in carrying out our invention, because we find it capable of giving rise to comparatively large mechanical effects. For this purpose we take the magnetic metal in the form of fine insulated wire, preferably of hard steel, and we cause the electrical oscillations to pass through it, at the same time causing it to suffer comparatively slow variations of longitudinal magnetism. We find that the hysteresis of the metal with respect to these slow variations is augmented when electrical oscillations pass through the wire, and we employ this augmentation of hysteresis to produce a mechanical effect, and thereby to indicate and, if necessary, record signals communicated in the form of electrical oscillations. This augmentation of hysteresis occurs when the oscillatory circular magnetism, due to the electrical oscillations traversing the wire, is superposed upon the longitudinal magnetization which is periodically varied by the field. We preferably give the magnetic metal the form of a small coil or bobbin of insulated wire, through which the electrical oscillations may pass.

In the accompanying drawings, Figure 1 is an elevation, partly in section, showing one construction of instrument according to this invention. Fig. 2 is a plan of the same. Fig. 3 shows a portion of the instrument in elevation, the view being taken at right angles to Fig. 1. Figs. 4, 5, 6, and 7 are diagrams showing various methods of winding the bobbins of the instrument. Fig. 8 shows diagrammatically part of another construction of instrument also according to our invention.

Referring to Figs. 1, 2, and 3, the poles A of a revolving magnet are carried on a yoke B and magnetized by coils C, which receive current through contact-rings D and brushes E from a battery or other convenient source. The magnet is caused to be revolved about a vertical central axis by an electrical motor or otherwise. The axis F of the magnet is provided with a driving-pulley G; but a motor may also be arranged on the axis itself. The axis F is carried upon a suitable bearing H. Between the poles A is pivotally mounted a magnetic body J. This consists of a bobbin wound with fine insulated steel wire, the ends of the wire being connected to terminals K. The magnet-poles A are preferably wedge-shaped to cause the magnetic lines to traverse as great a length of the winding as possible. The bobbin is carried on pivots L L' and is controlled by a torsion-spring M. The pivots L L' serve as conductors to connect the ends of the wire and the bobbin with the terminals K, contact at the top taking place through the spring K' and at the bottom through a small quantity of mercury, into which a wire $K^2$ from one terminal dips. A suitable torsion-head N is provided for adjusting the spring, and adjustments can also be made at O to allow the pivoted bobbin to be accurately centered with respect to the revolving magnet by means of movements in each of two horizontal directions. Means are also provided by nuts P and by slots in the yoke B to adjust the distance of each magnet-pole from the axis of rotation. The bobbin and its winding J are contained in a vessel J' full of petroleum or other insulating liquid of suitable viscosity, which damps the vibrations of the bobbin when it is suddenly displaced or released and causes its movements to be comparatively dead-beat. The axis which carries the bobbin J also carries an indicator, by which the deflection of the bobbin is exhibited or recorded. This may be simply a mirror, or it may be a pointer of any kind—say like that of a siphon-recorder, marking its movements on a paper strip—or it may be a pointer furnished with a contact-point operating a relay, and thereby recording any deflections exceeding a certain limit, or it may be an indicator of any other kind. It is convenient to have means of regulating the strength of current in the coils C in order to secure a condition of high sensibility. When the magnet A is set to revolve, the bobbin J tends to follow it in consequence of the energy expended in reversing the magnetism of the iron or steel winding which it carries, and this tendency is met by applying a suitable restoring moment by means of the spring M. Then when electric oscillations pass through the wire on the bobbin we find that the deflection of the bobbin is increased. This effect is shown by a sudden deflection in the direction in which the magnet revolves. The deflection persists while the electric oscillations continue, and the bobbin returns when the oscillations cease. Thus long and short periods of oscillation are exhibited by long and short periods of augmented deflection. We may obtain the revolving field either by causing magnets to rotate or in any other well-known way—as, for example, by using a fixed ring-magnet wound with coils so arranged as to cause poles to travel around it when the current in each coil is periodically reversed. The bobbin is wound with fine steel wire, preferably with a diameter of from .0024 to .0012 of an inch, the wire being so wound that the magnet A causes each portion of it to be magnetized substantially in the direction of its length. For the winding we may use iron, steel, nickel, or other paramagnetic metal; but we prefer fine wire drawn from cast-steel.

Figure 5:
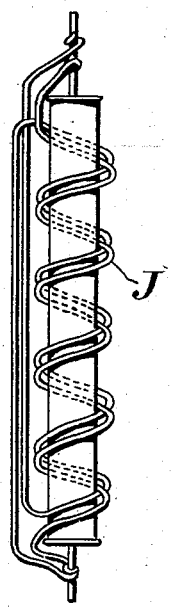
Figure 6:
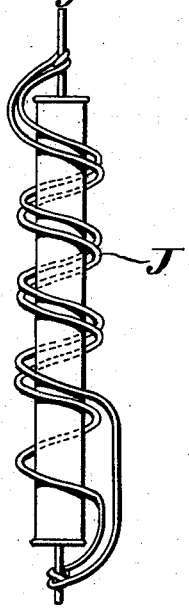
Figure 7:
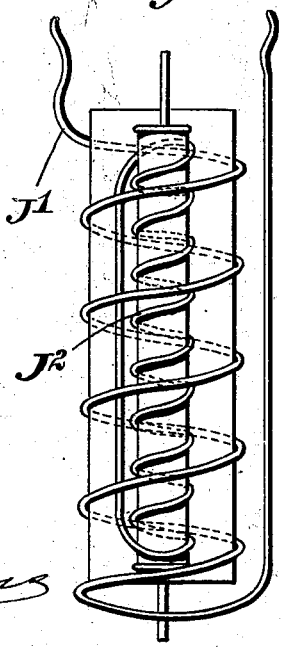

Referring to Figs. 4 to 10, the pivoted magnetic body J may have many forms and the magnetic metal on it may be arranged in many ways. The simplest arrangement is shown in Fig. 4, in which the wire is doubled on itself and wound on a core of ivory or the like in the manner usual in winding resistance-coils. The bobbin of wire is thereby made nearly non-inductive, but not perfectly so, since the wire is itself of magnetic material. Two or more coils made non-inductive in this manner may be used and may be grouped in series or in parallel. Another arrangement of non-inductive winding is shown in Fig. 5, in which two windings are connected in parallel, with the current flowing in opposite directions. As shown in Fig. 6, we may divide the coil into two or more parts wound inductively, (without doubling the wire on itself,) and by making the number of turns in them slightly unequal we may cause the coils to coöperate by their mutual induction, whereby the current in each coil may be greater than the current in the undivided circuit. In this case the wave length of the oscillation should be large compared with the length of the winding.

We may cause the electric oscillations to pass through a primary coil of insulated wire which induces corresponding oscillations in a secondary coil. This secondary coil may be closed on itself and in that case may form the deflectable part of the system. Thus in Fig. 7 the primary coil J' consists of a winding of fine insulated copper wire on an external tube or holder and the secondary coil $J^2$ consists of fine insulated steel wire on the pivoted bobbin. The secondary is closed either directly, as shown, or through a capacity. If desired, both primary and secondary may be wound on the bobbin and both may be of magnetic material.

Referring to Fig. 8, we may use two magnetic bodies, such as $J^5$, connected together to form one deflectable system, each in a distinct revolving field formed by the poles $A^2$ and $A^3$. We make the two fields revolve in opposite directions, and thereby produce a balance of effects so long as no electrical oscillations pass. Then on passing electrical oscillations through one of the bodies this balance is disturbed and a deflection is observed. It will be understood that this figure is purely diagrammatic.

Our apparatus is employed for the detection of electrical oscillations in a similar manner to and in lieu of the coherer or magnetic detector now common in wireless telegraphy—that is to say, the arrangements for causing electrical oscillations to be transmitted may be of any character and also the arrangements for receiving such oscillations, except that our detector takes the place of the coherer or other detector now used. In some cases it may be necessary where our detector replaces another type to provide suitable additional capacities in order to neutralize the self-induction thereby introduced.

Instead of pivoting the magnetic metal and making the magnet revolve we may in some cases cause the iron to rotate and suspend or pivot the magnet so that the hysteresis of the iron tends to deflect the magnet. The other arrangement is, however, considered preferable, as it allows the suspended system to be light, thereby fitting it to respond quickly to signals which are made up of electrical oscillations.

What we claim as our invention, and desire to secure by Letters Patent, is—

1. In an apparatus for detecting electrical oscillations the combination of a magnetic body movably mounted in a relatively movable magnetic field and means for causing electrical oscillations to pass through the magnetic body.

2. In an apparatus for detecting electrical oscillations the combination of a rotating magnetic field, a magnetic body pivotally mounted in said field, and means for causing electrical oscillations to pass through the magnetic body.

3. In an apparatus for detecting electrical oscillations the combination of a rotating magnetic field, a magnetic body pivotally mounted in said field, means for causing electrical oscillations to pass through the magnetic body, and resilient means for controlling the magnetic body.

4. In an apparatus for detecting electrical oscillations the combination of a rotating magnetic field, a magnetic body pivotally and resiliently mounted in said field and deflected thereby, means for causing electric oscillations to pass through the magnetic body and means for indicating the resulting variation in deflection.

5. In an apparatus for detecting electrical oscillations the combination of a rotating magnetic field, a bobbin of non-magnetic material pivotally mounted in said field, a winding of insulated magnetic wire on said bobbin and a torsion-spring controlling the bobbin.

6. In an apparatus for detecting electrical oscillations the combination of a rotating magnetic field, a bobbin of non-magnetic material pivotally mounted in said field, an approximately non-inductive winding of insulated magnetic wire on said bobbin and a torsion-spring controlling the bobbin.

7. In an apparatus for detecting electrical oscillations the combination of opposite wedge-shaped electromagnets pivoted on a central axis, means for rotating them about the axis, a bobbin of non-magnetic material pivotally mounted between the magnets, a torsion-spring controlling the bobbin, means for adjusting the position of the bobbin, a winding of insulated magnetic wire on the bobbin and a vessel containing viscous insulating liquid surrounding the bobbin.

In testimony whereof we have signed our names to this specification in the presence of two subscribing witnesses.

LOUIS HEATHCOTE WALTER.
JAMES ALFRED EWING.

Witnesses as to the signature of Louis Heathcoate Walter:
WILLIAM EATON,
HENRY HAYDEN.

Witnesses as to the signature of James Alfred Ewing:
CHARLES CAVE,
JOHN WALKER.